April 21, 1970     R. K. HILL     3,508,137

BRUSHLESS D.C. TACHOMETER

Filed Sept. 29, 1967

INVENTOR.
ROY K. HILL

BY 3,508,137
BRUSHLESS D.C. TACHOMETER
Roy K. Hill, Bristol, Tenn., assignor to Sperry Rand Corporation, Sperry Farragut Division, Bristol, Tenn., a corporation of Delaware
Continuation-in-part of application Ser. No. 228,849, Oct. 8, 1962. This application Sept. 29, 1967, Ser. No. 671,842
Int. Cl. H02m 7/30, 7/86; G01p 3/68
U.S. Cl. 321—28                                    9 Claims

ABSTRACT OF THE DISCLOSURE

A brushless D.C. tachometer is constructed with a permanent magnet rotor having a flux field cutting the conductors of a stator winding to induce voltages therein. Static switching means connects stator winding sections in predetermined order to the output terminals of the tachometer so that for a given direction of rotor rotation predetermined voltage polarities appear at the output terminals. The static switching means is constructed of a plurality of symmetrical bilateral type phototransistors or a plurality of pairs of reverse-parallel connected non-symmetrical phototransistors. It appears that phototransistors, when illuminated, generate internal voltages resulting in only minute internal voltage drops, thereby improving output linearity of the tachometer.

---

This application is a continuation-in-part of application Ser. No. 228,849, filed Oct. 8, 1962, now U.S. Patent No. 3,364,407.

This invention relates to brushless D.C. tachometers in general and more particularly relates to a tachometer construction of this type which utilizes phototransistors as switching elements.

Brushless D.C. tachometers of the prior art were generally of a type which included a permanent magnet alternator with a static rectifier for conversion from A.C. to D.C. Such prior art devices were not sensitive to direction of rotation as well as non-linear and inaccurate probably because static rectifying devices have a relatively high internal voltage drop which severely limits linearity and accuracy especially at the lower portion of the speed range. For example, germanium and silicon crystal diode rectifiers have intrinsic voltage drops of approximately 0.3 and 0.6 volt, respectively. Tunnel diodes operating below peak currents yield voltage drops about one-third of the foregoing values, but are critical to employ since they may oscillate because of negative resistance effects.

On the other hand, a non-symmetrical phototransistor, when operated as a rectifying element, produces an extremely small internal voltage drop possibly due to the internal generation of voltages as light impinges thereon. The instant invention focuses on the use of low internal voltage dropping phototransistors as rectifying and switching elements to improve linearity of a brushless D.C. tachometer.

Accordingly, a primary object of the instant invention is to provide a novel brushless D.C. tachometer having improved linearity and accuracy.

Accordingly, a primary object of the instant invention is to provide a novel brushless D.C. tachometer utilizing solid state rectifying elements having extremely low internal voltage drops.

Still another object is to provide a novel brushless D.C. tachometer which utilizes phototransistors as rectifying and switching elements.

A further object is to provide a novel brushless tachometer utilizing symmetrical bilateral phototransistors as switching elements.

A still further object is to provide a novel brushless D.C. tachometer utilizing a pair of non-symmetrical, reverse parallel connected, unilateral phototransistors as switching elements.

These as well as other objects of this invention will become readily apparent after reading the following description of the accompanying drawings in which.

Figure 1:
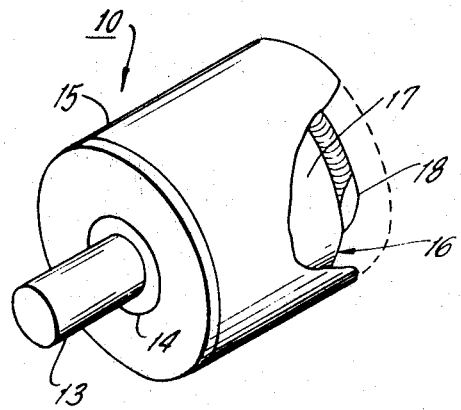
FIGURE 1 is a perspective of a brushless D.C. tachometer constructed in accordance with the teachings of the instant invention.
Figure 2:
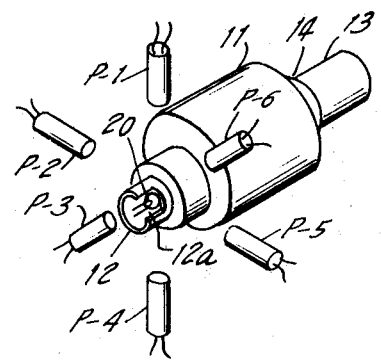
FIGURE 2 is a rear view perspective showing the relation between selected elements of the tachometer of FIGURE 1.

Now referring to the figures. Brushless D.C. tachometer 10 includes permanent magnet rotor 11 and light shield 12 both keyed to input shaft 13 mounted to bearings 14 at the ends of housing 15. Rotor 11 is centered within armature assembly 16 which includes magnetic frame 17 and stator winding 18. Light shield 12, having aperture 12a, is surrounded by six circularly arranged equally spaced phototransistor devices P–1 through P–6.

Winding 18 is divided into three equal sections 31, 33, 35 connected end to end in a closed loop arrangement at junctures or taps 41, 43, 45. Tap 41 is connected to bus 41a having phototransistors P–1 and P–4 connected directly thereto. Phototransistors P–3 and P6 as well as tap 43 are connected directly to bus 43a while phototransistors P–2 and P–5 as well as tap 45 are connected directly to bus 45a. Tachometer output terminal 25 is connected directly to bus 25a having phototransistors P–1, P–3 and P–5 connected directly thereto while tachometer output terminal 26 is connected directly to bus 26a having phototransistors P–2, P–4 and P–6 connected directly thereto.

Figure 3:
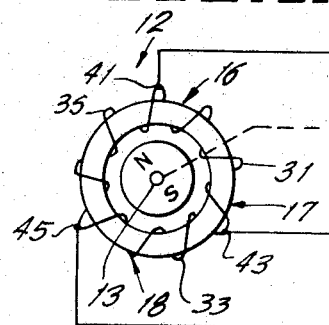
FIGURE 3 is a schematic of the operating elements constituting the tachometer of FIGURE 1.

Now considering shaft 13 rotating rotor 11 in a clockwise direction with respect to FIGURE 3. In the position shown in FIGURE 3 for rotor 11 a voltage maximum is induced in winding section 35 with tap 41 having a negative polarity with respect to tap 45. A voltage maximum is also induced across the series connected windings 31 and 33. As seen in FIGURE 3, phototransistors P–1 and P–2 are illuminated by light originating at source 20 which passes through light shield aperture 12a, while the remaining phototransistors P–3 through P–6 are not illuminated by virtue of the position of shield 12. It is noted that each of the phototransistors P–1 through P–6 are of the symmetrical bilateral type illustrated schematically in FIGURE 4 but they may be pairs of the non-symmetrical type illustrated schematically in FIGURE 5. Such type devices are sold by Texas Instruments, Inc., Dallas, Tex., under type 1N2175 and LS–400 for the symmetrical and non-symmetrical types, respectfully.

The illumination of phototransistors P–1 and P–2 provides a low impendence connection between winding taps 41, 45 and output terminals 25, 26, respectively, so that terminal 25 is negative with respect to terminal 26. Thus, the voltage of stator winding 18 appearing at taps 41, 45 appears at terminals 25, 26, respectively. The internal voltage drops of phototransistors P–1 through through P–6 are negligible.

Further clockwise rotation of shaft 13 past the position where phototransistors P–1, P–2 and P–3 are illuminated causes equal voltages to be induced in winding sections 33 and 35 and tap 45 is positive with respect to both taps 41 and 43. Phototransistors P–1 and P–3 provides low imepedance connections from output terminal 25 to winding taps 41, 43, and phototransistor P–2 provides a low impendance connection between output terminal 26 and winding tap 45 so that the polarity at output terminals 25, 26 remains unchanged.

As shaft 13 is rotated still further clockwise past the postion where shield aperture 12a is symmetrical about phototransistors P–2 and P–3, the voltage at tap 43 will be negative with respect to the voltage at tap 45. Phototransistor P–2 provides a low impedance connection between tap 45 and output terminal 26 while phototransistor P–3 provides a low impedance connection between tap 43 and output terminal 25. Similar action continues and after rotor 11 has rotated 180° from the position shown in FIGURE 3, shield aperture 12a is symmetrical about phototransistors P–4 and P–5. As rotor 11 passes this new postion where the south pole face is symmetrical with respect to winding section 35, the voltage induced is negative at tap 45 with respect to tap 41. Phototransistor P–4 provides a low impedance connection between tap 41 and output terminal 26 while phototransistor P–5 provides a low impedance connection between tap 45 and output terminal 25. Thus, it is seen that so long as there is clockwise rotation of rotor 11 the voltage at output terminal 25 is negative with respect to the voltage at output terminal 26.

With rotor 11 rotating in a counterclockwise direction past the position shown in FIGURE 3 where P–1 and P–2 are illuminated and the north pole face of rotor 11 is adjacent to winding section 35 , a voltage maximum is induced in winding section 35 with tap 45 being negative with respect to tap 41. Phototransistor P–1, being illuminated, provides a low impedance connection between tap 41 and output terminal 25 and phototransistor P–2, also being illuminated, provides a low impedance connection between tap 45 and output terminal 26. Therefore, the voltage at output terminal 25 is positive with respect to the voltage at output terminal 26. Thus, it is seen that the polarity of the voltage appearing across output terminals 25, 26 reverses as the direction of rotation for rotor 11 is reversed.

The voltage amplitude developed across the winding sections is proporational to the flux of the rotor magnet and to the angular velocity of the rotor. The amplitude of the voltage at output terminals 25, 26 is equal to the voltage at the commutated winding taps (those taps connected directly through illuminated phototransistors to the output terminals) less the drop in the phototransistors. The voltage drop in a fully illuminated phototransistor is insignificant in the type of application under consideration probably due to the fact that illumination of phototransistors appears to cause voltages to be generated internal to the phototransistors.

Figure 4:
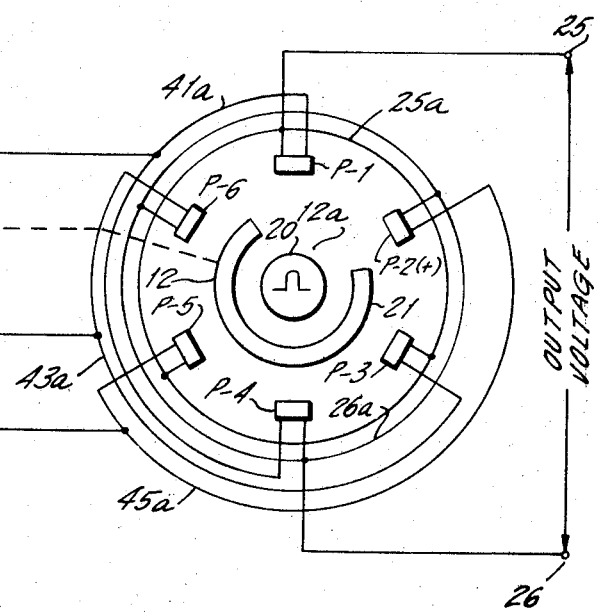
FIGURE 4 is a schematic of a symmetrical bilateral phototransistor.
Figure 4:
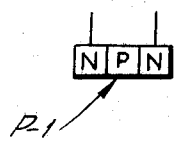
Figure 5:
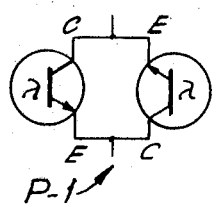
FIGURE 5 is a schematic showing two parallel-reverse connected non-symmetrical phototransistors.

While phototransistors P–1 through P–6 are illustrated in FIGURE 4 as being single symmetrical bilateral units, it should be apparent to those skilled in the art that the phototransistor of FIGURE 4 may be replaced by two non-symmetrical phototransistors reverse-parallel connected, as in FIGURE 5, to simulate the symmetrical bilateral effect.

While the tachometer hereinbefore described is constructed with a delta winding having three taps and two commutating phototransistor devices for each tap, it is noted that such construction was chosen merely for simplicity of illustration and description. The three winding section configuration is the lowest practical number of winding sections which does not allow the voltage to instantaneously drop to zone during rotor rotation. However, for applications requiring relatively lower ripple in the output, the stator winding should be provided with a larger number of taps and associated commutating phototransistors. A tachometer utilizing a stator winding with nine taps and eighteen phototransistor devices yields a commutation zone of 20° and with such construction it is relatively simple to design an amature-magnet structure to yield very low ripple in the output. It is noted that the closed loop or delta stator winding illustrated in FIGURE 3 may be replaced by a star winding. However, for stator windings having more than three taps the closed loop configuration results in a unit which is physically smaller and lighter than a star winding or separate windings.

The embodiments of the invention in which an exclusive privilege or property is claimed are defined as follows:

1. A brushless D.C. tachometer including stator winding means divided into a plurality of winding sections, a permanent magnet rotor; means rotationally mounting said rotor with magnetic flux lines thereof encompassing and being cut by conductors of said stator as said rotor rotates whereby voltages related to rotor position and direction of rotation are induced in said winding sections; first and second output terminals; static switching means including a plurality of sections connected to said terminals and connected to said winding sections at a plurality of tap points, each of said switching sections comprising a bilateral phototransistor device connected directly between one of said terminals and one of said taps; each of said phototransistor devices normally in a high impedance current blocking state and operated into a low impedance current conducting state upon impingement of light thereon; control means including a light souce and directing means rotatable with said rotor for directing impingement of light from said source upon predetermined ones of said sections of said switching means in accordance with angular position of said rotor whereby for a given direction of rotation of said rotor low impedance connections provided by said switching means between said taps and said terminals are such that voltage polarities at said terminal are the same for all positions of said rotor; for any given position of said rotor said directing means causing light from said source to impinge upon at least two of said switching sections.

2. A tachometer as set forth in claim 1 in which each of said bilateral units is symmetrical.

3. A tachometer as set forth in claim 1 in which each of said phototransistor devices includes a first and a second non-symmetrical unit reverse-parallel connected.

4. A tachometer as set forth in claim 1 in which for essentially all positions of said rotor during rotation thereof voltages induced in at least two of said winding sections contribute to voltage appearing between said terminals.

5. A tachometer as set forth in claim 4 in which for essentially any given position of said rotor during rotation thereof there is a relatively low impedance circuit between said terminals; said circuit including a first and a second of said winding sections connected in series between a first and second of said switching sections.

6. A tachometer as set forth in claim 5 in which there is a first and a second group of switching sections; each of said taps connected to said first terminal by an individual switching section of said first group and to said second terminal by an individual switching section of said second group; said switching sections of said first and said second groups disposed in a circular array with the sections of said first group interposed between the sections of said second group.

7. A tachometer as set forth in claim 6 in which each of said phototransistor devices is a bilateral unit.

8. A tachometer as set forth in claim 5 in which said winding sections are at least three in number.

9. A tachometer as set forth in claim 8 in which the winding sections are connected end to end at said taps to form a closed loop.

References Cited

UNITED STATES PATENTS 3,023,348  2/1962  Cox _____ 318—480 X
3,096,467  7/1963  Angus et al. _____ 318—254 X
3,412,303  11/1968  Rikes _____ 318—138

LEE T. HIX, Primary Examiner

G. GOLDBERG, Assistant Examiner

U.S. Cl. X.R.

310—68, 73; 318—138, 254; 322—8, 26; 324—70